United States Patent [19]

Wilcox

[11] 4,035,028

[45] * July 12, 1977

[54] WHEEL ASSEMBLIES AND COMPONENTS

[76] Inventor: Raymond J. Wilcox, 44 Via Casitas, San Luis Rey Downs, Calif. 92068

[ * ] Notice: The portion of the term of this patent subsequent to July 13, 1993, has been disclaimed.

[21] Appl. No.: 595,476

[22] Filed: July 14, 1975

[51] Int. Cl.[2] .......... B60B 5/02

[52] U.S. Cl. .......... 301/13 SM; 301/63 DD; 301/63 PW; 301/95; 301/105 R

[58] Field of Search ....... 301/63 PW, 63 D, 63 DD, 301/63 DS, 63 DT, 63 R, 37 P, 105 R, 95–96, 9 R, 10 R, 13 R, 13 SM

[56] References Cited

U.S. PATENT DOCUMENTS

| | | | |
|---|---|---|---|
| 1,230,616 | 6/1917 | Stevenson | 301/13 SM |
| 1,562,696 | 11/1925 | Garriott | 301/63 D |
| 3,669,501 | 6/1972 | Derleth | 301/37 P |
| 3,811,737 | 5/1974 | Lejeune | 301/63 PW |
| 3,909,065 | 9/1975 | Main | 301/63 R X |

FOREIGN PATENT DOCUMENTS

| | | | |
|---|---|---|---|
| 969,323 | 5/1950 | France | 301/105 R |
| 916,114 | 8/1946 | France | 301/63 DD |
| 1,331,322 | 9/1973 | United Kingdom | 301/63 R |
| 453,876 | 9/1936 | United Kingdom | 301/63 DD |
| 1,372,357 | 10/1974 | United Kingdom | 301/63 PW |

*Primary Examiner*—Robert B. Reeves
*Assistant Examiner*—Charles A. Marmor
*Attorney, Agent, or Firm*—Reising, Ethington, Barnard, Perry and Brooks

[57] ABSTRACT

Vehicle wheel components of the disclosure are manufactured by a foam construction wherein structural members are secured to each other to define a cavity that receives foam which adheres to the members so as to cooperate therewith as a load bearing component. The foam construction is utilized in one embodiment to provide a wheel hub that is mounted on a vehicle axle so as to rotatably support a vehicle wheel on the axle. A wheel of a second embodiment includes a disc and rim that are each made with the foam construction. The disc is fixedly mounted on a wheel hub and the rim is detachably secured to the disc so that different rims may be mounted on the disc. A vehicle wheel assembly of a third embodiment is particularly designed for heavy-duty truck or trailer use. This heavy-duty wheel assembly includes a pair of rims having the foam construction and detachably secured to a disc portion of a hub mounted on a vehicle axle.

29 Claims, 3 Drawing Figures

WHEEL ASSEMBLIES AND COMPONENTS

BACKGROUND OF THE INVENTION

1. Field of the Invention

This invention relates to vehicle wheel assemblies and to components of these wheel assemblies.

2. Description of the Prior Art

Vehicle wheel assemblies conventionally include a wheel hub that rotatably mounts an associated wheel on a vehicle axle. The hub is conventionally manufactured as a steel forging or casting and has an annular configuration. A central opening of the hub includes bearing seats for receiving antifriction bearings that rotatably support the hub on the axle. The hub also includes provisions for supporting a vehicle brake component, such as a drum or a disc, used in the braking action of the vehicle. At its outer extremity, the hub includes provisions for supporting an associated vehicle wheel.

Conventional automotive wheels include an annular rim that supports an associated tire. A disc of the wheel is secured to the rim within its annular configuration. The central portion of the wheel disc includes holes for receiving bolts which detachably secure the wheel to an associated hub. The wheel rim and disc are conventionally made by forging of steel stock that is of a relatively heavy gauge, i.e. on the order of one-eighth inch thickness. The outer periphery of the disc is fixedly secured to the rim by welding so that the rim and disc are inseparable. The point of separation between the components of the automotive wheel assembly thus occurs at the wheel disc and hub during replacement or repair of the associated vehicle tire. This necessarily means that each automotive vehicle having four wheel assemblies being utilized and one spare tire requires five wheels having a rim and disc. The forging process of the relatively heavy steel stock from which the wheel components are made must be carried out with sufficient accuracy so that no unbalanced forces are present during the rotation of the wheel. The heavy stock from which the wheel is forged makes this balancing somewhat more difficult than would be the case if lighter stock were utilized. However, to provide the required structural strength, such heavy stock is necessary with conventional automotive wheels.

U.S. Pat. application Ser. No. 527,555, filed Nov. 27, 1974, and now U.S. Pat. No. 3,968,996, discloses an automotive wheel whose attached rim and disc are manufactured from an outer steel skin that defines a single cavity for receiving load bearing foam that cooperates with the skin in carrying the wheel load. The rim and disc portions of this wheel are integrally formed with each other so that separation during tire repair or replacement occurs between the wheel disc portion and the hub.

Vehicle wheel assemblies of the more heavy-duty type for use on trucks or trailers have a somewhat different construction than automotive wheel assemblies. These heavy-duty wheel assembly constructions conventionally include a wheel hub that is cast or forged from steel. The disc portion of the wheel may be integral with the hub and support the brake drum or brake disc of the wheel assembly. The outer periphery of the integral hub and wheel disc detachably supports one or more wheel rims for carrying one or more tires. The heavy-duty wheel assembly construction may also take another form wherein the rim and disc portions of the wheel are welded to each other and detachably secured to the wheel hub. In this construction, the brake drum or brake disc is fixedly secured to the hub. Both of these heavy-duty wheel assembly constructions require a relatively large amount of machining to provide the balanced wheel assembly necessary.

U.S. Pat. No. 3,874,055 discloses a method of making a vehicle wheel that is particularly designed for use as a heavyduty truck or trailer type wheel. The disc portion of this wheel is manufactured from a continuous metallic strip that is stamped to define retaining flanges. The stamped strip is then coiled into a single closed loop that is stamped radially to define spoke-like components. The central portion defined by these spoke-like components is secured to a cast or forged hub. The periphery of this stamped structure is detachably secured to a pair of rims to complete the assembly. The hub and rims of this wheel assembly are both forged or cast and may require machining to provide the necessary balance.

SUMMARY OF THE INVENTION

The present invention provides vehicle wheel assemblies and components thereof that are manufactured with a foam construction so as to have light weight, good balance without any machining, and a low manufacturing cost. The foam construction includes structural members of a relatively light weight that are secured to each other to define an enclosed cavity that receives an organic resin foam, such as polyurethane foam. The foam may be injected into the cavity so as to adhere to the structural members during its curing. Alternately, the foam may be preformed and received between the structural members as these members are secured to each other. In the latter case, an adhesive adheres the foam to the structural members defining the cavity.

One embodiment of the invention provides a vehicle wheel hub for mounting an associated wheel on a vehicle axle. The hub includes a plurality of structural members generated about a central axis in annular configurations and secured to each other to define an annular cavity. Foam is received within the cavity and adheres to the structural members to cooperate with these members as a load bearing component of the hub. The hub defines a central opening for receiving a vehicle axle on which it is to be mounted. The hub includes bearing seats within the central opening for receiving antifriction bearings that mount the hub on the axle. The hub also includes a mounting portion to which the disc of a vehicle wheel is mounted so as to be rotatably supported with respect to the axle. The mounting portion extends outward in a radial direction.

The above wheel hub is preferably constructed from two structural members of steel or aluminum that oppose each other in an axial relationship with respect to the central axis of the hub. These two structural members each include radially extending inner and outer flanges. The flanges project externally with respect to the cavity of the hub, thereby enabling them to be welded to the flanges of the other member to provide the securement of each member to the other. The wheel mounting portion of the hub includes a spacer located between spaced portions of the structural members between which the foam also is located. The spacers provide support between the spaced portions of the structural members to enable attachment bolts to be utilized to mount the wheel. If the structural members are of steel, the spacers may be formed integrally from one of them by a stamping operation and may be threaded to receive the attachment bolts. If the structural members are made of aluminum, separate threaded spacers of steel are used to prevent stripping of the threads.

In another embodiment of the invention, a vehicle wheel includes a disc adapted to be fixed to an associated hub and a rim for supporting a vehicle tire. The disc and the rim each include a plurality of structural members secured to each other to define an associated cavity. Foam is received within and fills each cavity so as to cooperate with the structural members as a load bearing component. The rim is detachably secured to the disc, preferably by attachment bolts, so as to permit the rim to be attached to different discs. This construction eliminates the necessity for the wheel disc on the spare tire of an automotive vehicle.

The disc of the wheel embodiment having the separable rim includes an axial surface that is seated against the hub to which the disc is fixedly mounted. The disc includes circumferentially spaced ribs between which depressions are formed to provide locations for attachment rivets or bolts that secure the disc to the hub. The disc and the rim each include radial mounting portions that respectively extend outwardly and inwardly to engage each other in an axial direction. The attachment bolts extend axially through the engaged mounting portions to provide the detachable securement of the rim to the disc. These mounting portions include radial surfaces that locate the rim with respect to the disc during the bolt attachment. The mounting portions of the rim and the disc include spaced portions of their associated structural members between which apertured spacers are positioned. The spacers receive the attachment bolts and provide the required structural support between the spaced portions of the structural members. The disc of the wheel includes an axially extending portion that gives the wheel a styled appearance. The styled axially extending portion includes the circumferentially spaced ribs and a radial ring that extends inwardly.

A further embodiment of the invention includes a wheel assembly that is particularly adapted for heavy-duty use with a truck or trailer. The wheel assembly includes a hub having a radially extending disc portion. The hub is formed by a plurality of structural members to define an enclosed cavity that receives foam adhered to the structural members so as to cooperate as a load bearing component of the hub. The hub defines a central opening for receiving a vehicle axle on which it is to be mounted. Bearing seats of the hub within the central opening receive antifriction bearings that mount the hub on the axle. The disc portion has a mounting portion at its radial extremity for detachably supporting at least one wheel rim. The wheel rim preferably includes a plurality of annular structural members secured to each other to define an enclosed cavity separate from the cavity of the hub. Foam is received within the rim cavity and adhered to its associated structural members so as to cooperate therewith as a load carrying component of the assembly. A pair of these rims are preferably mounted adjacent one another to provide a dual tire wheel assembly.

Each rim of the dual tire wheel assembly includes a radial mounting portion that extends inwardly to engage the mounting portion of the other rim during mounting of the rims to the disc portion of the hub. These mounting portions of the rims are secured to a mounting portion of the disc portion by attachment bolts that extend through the mounting portions. The mounting portions each include spaced portions of their associated structural members. Apertured spacers positioned between these spaced portions provide support between the members. The attachment bolts are received by the spacers as they extend through the mounting portions to provide detachable securement of the rims to the disc portion of the hub. The disc portion of the hub preferably includes circumferentially spaced ribs and intermediate depressions. The structural members of the hub include axially spaced portions aligned with the depressions. Apertured spacers between these axially spaced portions provide support between the structural members that enables bolts to extend through these spacers and secure a brake component to the disc portion. The outer ends of the ribs include radial surfaces that face outwardly to engage and position the rims of the assembly during their mounting.

The hub of the wheel assembly preferably includes an annular inner member and a pair of axially opposed members that cooperate with the inner member to define the cavity of the hub. One of the axially opposed members has an annular configuration, and the other has a stamped configuration that defines the ribs and depressions of the hub.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
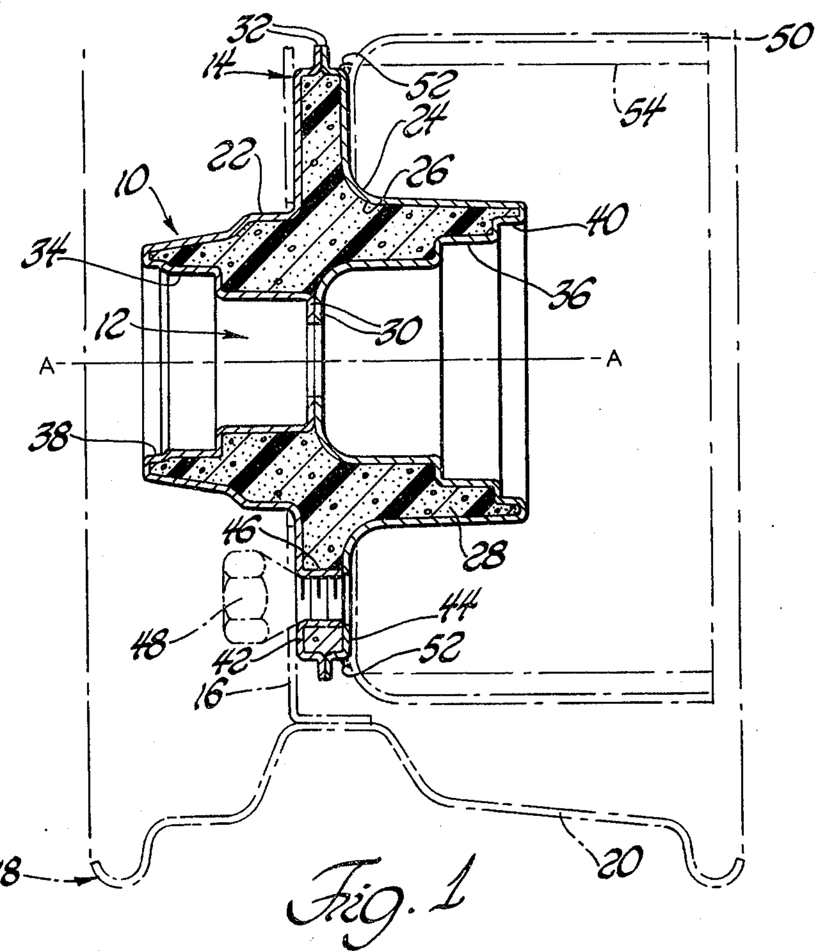
FIG. 1 is a sectional view of a vehicle wheel hub according to one embodiment of the present invention.

With reference to FIG. 1 of the drawings, a vehicle wheel hub generally indicated by 10 is constructed in accordance with one embodiment of the invention. The wheel hub includes a central axis A—A and is generated about this axis in an annular configuration. The hub 10 has a central opening 12 that receives a vehicle wheel axle on which the hub is adapted to be mounted. The outer periphery of the hub includes an annular mounting portion 14 for mounting the disc 16 of a wheel 18. The wheel also includes an annular rim 20 for mounting a tire.

The hub 10 includes a pair of structural members 22 and 24 that are preferably formed by a stamping process from relatively thin stock, i.e. on the order of 1/16 inch. The stock material is preferably cold rolled steel or aluminum. The structural members oppose each other in an axial direction with respect to axis A—A to cooperatively define an enclosed cavity 26. Organic resin foam 28, such as polyurethane foam, is received within the cavity to fill its entire volume. The structural members each include inner and outer radial flanges 30 and 32. The inner flanges 30 extend inwardly within the central opening 12 of the hub in an opposite direction from the cavity 28 so as to be located externally with respect to the cavity. The outer flanges 32 extend outwardly at the outer periphery of the hub so as to also be located externally with respect to the cavity. The external positioning of the flanges 30 and 32 with respect to the hub cavity 26 enables these flanges to be welded from axial opposite sides in an economical manufacturing step.

After the securement of the structural members 22 and 24 to each other, organic resin foam, such as polyurethane foam, is injected into the cavity 26 to fill its volume. The foam then cures and adheres to the structural members so as to cooperate with these members as a load bearing component. The foam may be injected through a suitable opening, not shown, that may be plugged or left open after the injecton. In an alternate mode of assembly, the foam is formed and cured to the required configuration prior to the securement of the structural members to each other. A suitable adhesive is applied to the preformed foam which is positioned between the structural members as they are secured to each other. The preformed foam fills the cavity and adheres to the structural members such that it acts as a load bearing component.

The structural members 22 and 24 respectively define annular bearing seats 34 and 36 for receiving the outer races of antifriction bearing whose inner races are supported by the vehicle axle which is coaxial with the hub axis A—A after mounting. The structural member 22 defines an annular seat 38 at the outboard end of the hub so as to receive an end bearing cap that seals the central opening. The structural member 24 likewise defines an annular seat 40 at the inboard end of the hub to receive a suitable sealing cap of an annular configuration. An inner surface of the annular cap slidably seals against the axle received within the hub. The mounting portion 14 of the hub includes spaced portions 42 and 44 of the structural members 22 and 24, respectively. These spaced portions 42 and 44 have an annular configuration with foam received between them. Structural member 22 is stamped to integrally define a plurality of circumferentially spaced spacers 46, only one being shown. The spacers 46 are threaded to receive attachment bolts 48, only one shown. These bolts extend through suitable apertures in the disc 16 of wheel 18 so as to detachably secure the wheel 18 in position. It should be noted that when aluminum stock is used to form the structural members 22 and 24, the threaded spacers 46 should be formed from separate steel inserts that extend between the spaced portions 42 and 44 of the members. This is necessary since aluminum threads are susceptible to stripping when torqued to the normal range of wheel attachment bolts.

A brake drum 50 is secured to the inboard side of the hub 10 in a suitable manner, such as by welds 52 that secure it to the structural member 24. The inner side of the drum has an annular surface 54 that faces inwardly to be engaged by one or more brake shoes. As an alternative to the brake drum support shown, this drum may be supported by the inboard side of the wheel disc 16 in any suitable manner. Likewise, a brake disc may also be used instead of a drum.

The wheel hub 10 described above is relatively light in weight and is easy to manufacture and assemble as compared to forged or cast steel hubs. No machining of the hub is necessary to achieve the required balance. The construction shown is also relatively inexpensive as compared to the more conventional forged or cast hubs, but still has the required structural strength.

Figure 2:
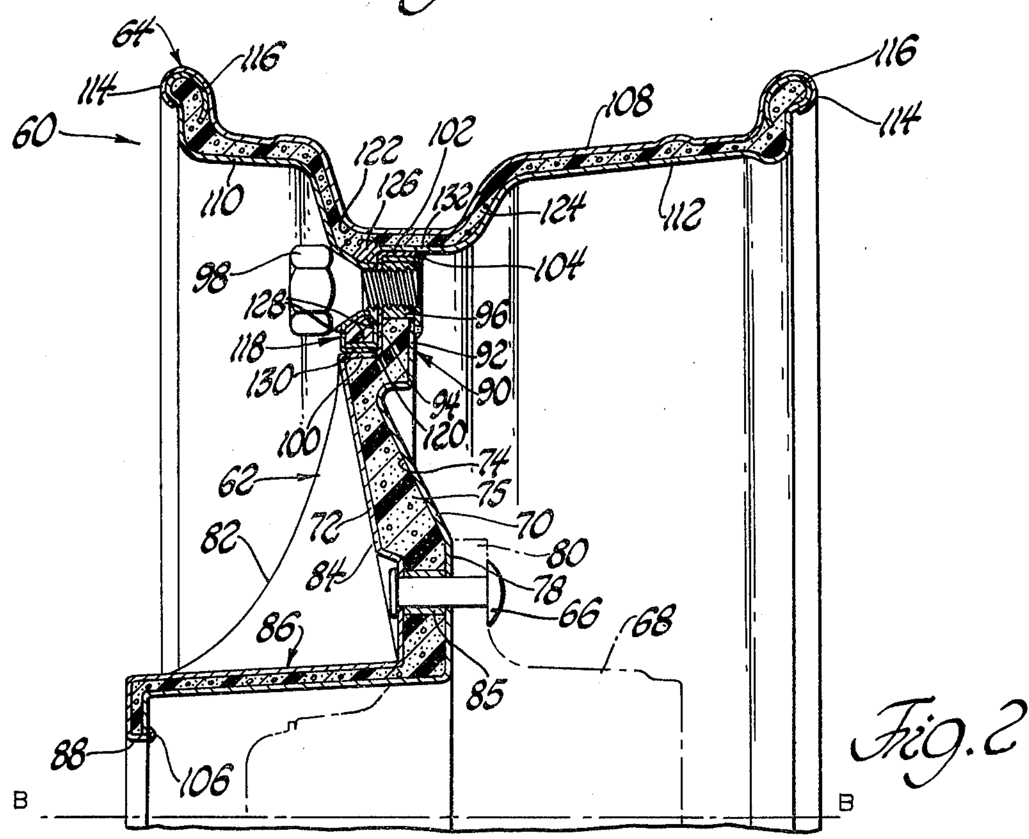
FIG. 2 is a half sectional view of a vehicle wheel constructed according to another embodiment of the invention.

With reference to FIG. 2, a vehicle wheel constructed in accordance with another embodiment of the invention is generally indicated by 60 and includes a disc 62 and a separable rim 64. The disc 62 is fixedly mounted by a plurality of circumferentially spaced rivets 66, only one shown, to a wheel hub 68 shown in phantom lines. This wheel hub supports the wheel about a central axis B—B that is aligned with a vehicle axle on which the hub is rotatably supported. The hub 68 may be of the conventional forged or cast steel type, but is preferably of the hub construction described in connection with FIG. 1.

The disc 62 of the wheel 60 includes a pair of structural members 70 and 72 that extend about the axis B—B and oppose each other in an axial relationship so as to cooperatively define an enclosed cavity 74. These structural members are first secured to each other. Organic resin foam 75, such as polyurethane foam, is then injected into the cavity 74 to fill its volume. The foam cures and adheres to the structural members 70 and 72 so as to cooperate therewith as a load bearing component. The foam may be injected through a suitable opening, not shown, that may be plugged or left open after the injection. In an alternate mode of assembly, the foam is formed and cured to the required configuration prior to the securement of the structural members to each other. A suitable adhesive is applied to the performed foam which is positioned between the structural members as they are secured to each other so that the foam fills the cavity and adheres to the structural members so as to act as a load bearing component.

The structural members 70 and 72 are preferably formed from low carbon, hot rolled steel that is of a relatively thin thickness, i.e. on the order of .015 inches. The structural member 70 has an annular configuration and includes an axial surface 78 that axially engages a mounting portion 80 of the hub 68. The structural member 72 is formed with circumferentially spaced ribs 82 between which intermediate depressions 84 are formed. These depressions form the locations where the rivets 66 extend through the disc 62 and the mounting portion 80 to fixedly secure the disc to the hub. Spacers 85 receive the rivets 66 and provide support between the adjacent spaced portions of the structural members 70 and 72. An axial portion 86 of the disc extends in an outboard direction from the rivets 66 to give the disc a styled appearance. At its outboard end, the axial portion 86 of the disc includes a radial ring 88 that extends inwardly to further provide this styled appearance.

The outer periphery of the disc 62 includes an annular mounting portion 90 for mounting the rim 64 with respect to the disc. The mounting portion includes spaced portions 92 and 94 of the structural members 70 and 72, respectively. These spaced portions have annular configurations. At circumferentially spaced locations, the mounting portion 90 includes apertured spacers 96 of steel that extend between the spaced portions 92 and 94. These spacers are threaded to receive attachment bolts 98 that are used to detachably secure the wheel rim 64 to the disc 62 in a manner that will be more fully described later. The mounting portion 90 includes inner and outer portions 100 and 102 that face radially outwardly and position the rim 64 during its bolt attachment.

The structural members 70 and 72 are preferably secured to each other by welding. Welds 104 at the outboard end of mounting portion 90 and welds 106 at the inboard side of the radial ring 88 are used to provide this welding securement.

The rim 64 of wheel 60 includes an outer structural member 108 of an annular configuration and a pair of inner structural members 110 and 112 that also have annular configurations. The structural members 108, 110 and 112 are preferably made from low carbon, hot rolled steel that is of a relatively light gauge, i.e. on the order of .015 inches. The outer member 108 includes rounded end flanges 114 that receive rounded end flanges 116 of the inner members 110 and 112. The inner members 110 and 112 cooperatively define an annular mounting portion 118 of the rim where the inner members 110 and 112 are secured to each other by welds 120. Structural members 108, 110 and 112 cooperatively define an annular cavity 122 that receives organic resin foam 124, such as polyurethane foam. The foam 124 is preferably injected into the cavity 122 to fill the cavity. The foam adheres to the structural members defining the cavity as it cures. The foam cooperates with the structural members 108, 110 and 112 of the rim as a load bearing component of the rim. In this construction, it is preferable to inject the foam as opposed to having a preformed foam that is received between the structural members during their securement to each other. This is because the annular configuration of the foam 124 is quite large and thus not particularly convenient to handle.

The mounting portion 118 of rim 64 includes circumferentially spaced spacers 126 through which the attachment bolts 98 extend. The spacers 126 provide support between spaced portions 128 of the two inner rim members 110 and 112. These spacers may also be provided by a single annular member with circumferentially spaced apertures. Inner and outer radial portions 130 and 132 of the rim 64 engage the inner and outer portions 100 and 102 of the disc 62 during mounting of the rim. This engagement locates the rim with respect to the disc during the bolt attachment.

A brake drum or brake disc may be suitably secured to either the hub 68 or the disc 62 so as to provide a braking action during use of the wheel 60. The securement may be provided by welding or by a bolt or rivet type of attachment.

The construction of wheel 60 permits it to be manufactured without requiring any machining of the wheel to provide the required balancing. The wheel is relatively light in weight as compared to the more conventional forged steel wheels that have the same structural strength. Also, due to the separable nature of the rim 64 from the disc 62, the spare wheel for an automotive vehicle only incorporates a rim as opposed to the more conventional combined disc and rim structure. Consequently, the cost necessary to manufacture the required wheels for an automotive vehicle is decreased.

Figure 3:
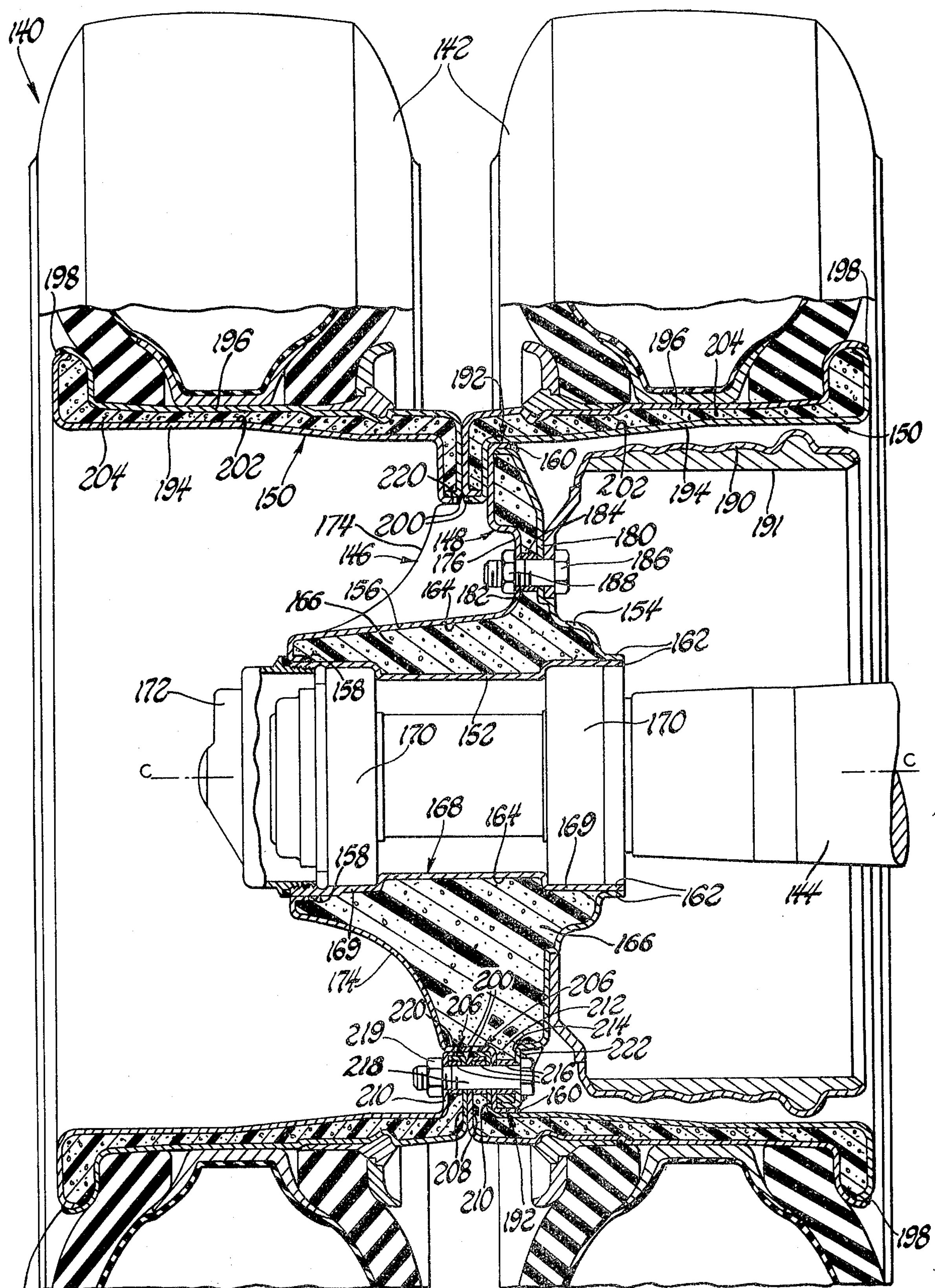
FIG. 3 is a sectional view of a vehicle wheel assembly constructed according to a third embodiment of the invention.

With reference to FIG. 3, a vehicle wheel assembly 140 according to a further embodiment of the invention, is generally indicated by numeral 140 and is particularly adapted for heavy-duty truck or trailer usage. The wheel assembly preferably mounts a pair of tires 142 in a side-by-side fashion for rotation with respect to a vehicle axle 144 about a central axis C—C. The assembly includes a hub 146 that is rotatably supported on the axle and has a disc portion 148 extending radially in an outward direction. A pair of wheel rims 150 are detachably secured to the hub disc portion 148 and mount the tires 142.

The hub 146 is manufactured from an inner structural member 152 of an annular configuration and a pair of outer structural members 154 and 156 that oppose each other in an axial relationship. The structural members 152, 154 and 156 are preferably made from low carbon, hot rolled steel of a thickness on the order of 1/16 inch. The structural members 152 and 156 are first secured to each other by an annular bead weld 158 that can be conveniently made since the member 154 is then not assembled to the other two members. Outer member 154 is then positioned in place and is secured by circumferentially spaced outer welds 160 adjacent the inboard tire rim 150. The member 154 is also secured to inner member 152 by suitable spot welds at engaged annular flanges 162 of these members. When secured to each other, members 152, 154 and 156 cooperatively define an enclosed cavity 164 that receives and is filled by foam 166.

The foam 166 is an organic resin foam such as polyurethane and adheres to the structural members that define cavity 164 so as to function as a load bearing component of the hub. This foam may be injected into the cavity so as to cure and adhere to the structural members defining the cavity during its curing process. Alternatively, the foam may be formed prior to the securement of the structural members to each other and positioned between the structural members during their securement with a suitable adhesive providing the adhering of the foam to the members.

The inner annular member 152 of hub 146 defines a central opening 168 that receives the vehicle axle 144 on which the wheel assembly is mounted. This inner member 152 also defines annular bearing seats 169 for the outer races of a pair of antifriction bearings 170. The inboard races of these bearings are seated on suitable seats of the axle 144 to thus provide the rotatable support of the hub 146 on the axle. As end cap 172 is threaded onto the outboard end of the hub.

The disc portion 148 of hub 146 extends radially and includes circumferentially spaced ribs 174 with intermediate depressions 176. The outer structural members 154 and 156 respectively include spaced portions 180 and 182 aligned with each depression 176. Apertured spacers 184 are received between these spaced portions 180 and 182 extending therebetween and receive associated attachment bolts 186 that are threaded to nuts 188 to secure a brake drum 190 to the hub. One or more brake shoes that are mounted with respect to the axle 144 engage an inner surface 191 of the brake drum to selectively provide a braking action.

The outer periphery of the hub disc portion 148 includes an annular mounting portion 192 for mounting the rims 150. These rims each include an inner structural member 194 of an annular configuration as well as an outer structural member 196 that also has an annular configuration. Structural members 192 and 194 are preferably made of low carbon, hot rolled steel of a thickness on the order of 1/16 inch. The inner and outer members 194 and 196 are secured to each other by outer welds 198 and inner welds 200 so that each rim defines an enclosed cavity 202 of an annular configuration. Organic resin foam 204, such as polyurethane foam, is injected into the cavity 202 so as to cure therein and adhere to the structural members defining the cavity. The foam functions as a load bearing component of each rim to cooperate with the structural members in carrying the load of the wheel assembly. It is preferable to have the foam injected within the cavity 204 rather than utilizing a preformed foam component since the annular configuration of the rim foam 204 cannot be readily handled for positioning between the structural members 194 and 196 during their securement to each other.

As readily seen by the lower portion of FIG. 3, the rims 150 each include radial mounting portions 206 that extend inwardly on the outboard side of the mounting portion 192 on hub 146. The rim mounting portions 206 include spaced portions 208 and 210, and the hub mounting portion 192 includes spaced portions 212 and 214. Apertured spacers 216 are located between the spaced portions of both the hub and rim mounting portions and provide support therebetween so as to receive an attachment bolt 218. The bolt and spacer arrangements are spaced circumferentially about the wheel assembly. The bolts 218 thus extend through the mounting portions 206 of the rim and the mounting portion 192 of the hub and threadingly receive associated nuts 219 so as to secure the rims to the hub. Unthreading of the nuts 219 allows removal of the rims for repair and replacement of the tires 142 while the hub remains in position.

The outboard ends of the hub ribs 174 define radial surfaces 220 that engage the inwardly facing surfaces on the inner ends of the rim mounting portions 206. This engagement locates the rims 150 during their bolt attachment to the hub 146. In this connection, it is desirable for the heads of the attachment bolts 218 to be welded as at 222 to the hub so that the bolts project outwardly like mounting studs to receive the rims.

The foam construction of the hub 146 and its integral disc portion 148, as well as the foam construction of the rims 150, provide a wheel assembly that can be manufactured in a balanced condition without any machining of the components of the assembly. The wheel assembly is relatively inexpensive and light in weight as compared to wheel assemblies of this type whose components are made from forged or cast steel. Nevertheless, the wheel assembly has the required structural strength.

While preferred embodiments have herein been described in detail, those skilled in the art will recognize various alternative constructions that embody the invention as defined by the following claims.

What is claimed is:

1. A vehicle wheel hub comprising: a plurality of metallic structural members generated about a central axis in annular configurations and secured to each other to define an annular cavity having an axially extending portion extending to opposite axial extremities of the hub and a radially extending portion projecting outwardly intermediate the axial extremities thereof; foam received within and filling the cavity and adhering to the metallic structural members to cooperate therewith as a load bearing component of the hub; said structural members of the hub defining a central opening for receiving a vehicle axle on which the hub is to be mounted and including at least two axially spaced annular bearing seats within the central opening respectively adjacent the axial hub extremities for receiving antifriction bearings that mount the hub on the axle; the hub also including a mounting portion including spaced structural member portions with the foam in the radially extending cavity portion therebetween; and means for securing a disc of a vehicle wheel to the mounting portion of the hub to mount the wheel with respect to said axle.

2. A hub according to claim 1 that includes two structural members which oppose each other axially with respect to the central axis to define the cavity.

3. A hub according to claim 2 wherein the structural members include interengaged radially extending inner and outer flanges secured to each other.

4. A hub according to claim 3 wherein the flanges of each member project externally with respect to the cavity and welds that secure the flanges of the structural members to each other.

5. A hub according to claim 1 wherein the structural members are first secured to each other to define the cavity into which the foam is injected for curing within the cavity so as to adhere to the members during the curing.

6. A hub according to claim 1 wherein the foam is preformed externally of the cavity and located between the structural members upon securement of these members to each other to define the cavity, and an adhesive being utilized to adhere to foam to the structural members.

7. A hub according to claim 1 wherein the mounting portion includes spacers located between said spaced portions of the structural members having the foam in the radially extending cavity portion therebetween, the spacers providing support between the spaced portions of the members, and said securing means including bolts that mount the disc of the wheel to the hub mounting portion in cooperation with said spacers.

8. A hub according to claim 7, wherein the structural members are composed of steel and one of said members includes portions integrally forming the spacers which are threaded to receive the bolts.

9. A hub according to claim 1 wherein the structural members are made of aluminum.

10. A vehicle wheel comprising: a disc adapted to be fixedly secured to a hub mounted on a vehicle axle; an annular rim for supporting a vehicle tire about a central axis; said disc and rim each including a plurality of metallic structural members secured to each other to define an associated cavity; said cavity of the rim projecting axially relative to the central axis to opposite axial extremities of the wheel and said cavity of the disc projecting radially relative to the central axis within the annular rim; foam recieved within and filling the rim and disc cavities and adhering to the associated structural members thereof to cooperate therewith as a load bearing component; and means for detachably securing the rim to the disc.

11. A wheel according to claim 10 wherein the disc includes an axial surface seated against the hub and circumferentially spaced ribs between which depressions are formed to provide locations for attachment of the disc to the hub.

12. A wheel according to claim 10 wherein the rim includes a radial mounting portion that extends inwardly and the disc includes a radial mounting portion that extends outwardly, the mounting portions of the disc and rim being engaged axially and said securing means including attachment bolts that secure the rim to the disc.

13. A wheel according to claim 12 wherein the mounting portions of the rim and disc include spaced portions of their associated structural members, apertured spacers positioned between the spaced structural member portions so as to receive the attachment bolts and provide support between the spaced portions.

14. A wheel according to claim 12 wherein the rim and disc include radial surfaces for locating each with respect to the other during the bolt attachment.

15. A vehicle wheel according to claim 10 wherein the foam is injected into the cavities of the rim and disc for curing and adhering to the structural members.

16. A wheel according to claim 10 wherein the disc includes an axially extending portion that gives the wheel a styled appearance.

17. A wheel according to claim 16 wherein the axially extending portion includes circumferentially spaced ribs and a radial ring.

18. A wheel according to claim 17 wherein the radial ring extends inwardly.

19. A wheel according to claim 10 wherein the rim includes an annular outer member and a pair of annular inner members.

20. A vehicle wheel assembly comprising: a hub including a plurality of metallic structural members secured to each other to define an enclosed cavity; foam received within and filling the cavity and adhering to the structural members to cooperate therewith as a load bearing component of the hub; said structural members of the hub defining a central opening for receiving a vehicle axle on which the hub is to be mounted and including axially spaced bearing seats within the central opening for receiving antifriction bearings for mounting the hub on the axle; the hub also including a disc portion extending radially from the opening and having a mounting portion at the outer radial extremity thereof; said rim including a plurality of annular metallic structural members secured to each other to define an enclosed cavity projecting to opposite axial extremities of the wheel; foam received within the cavity of the rim and adhered to the structural members thereof to cooperate therewith as a load bearing component of the assembly; at least one wheel rim for supporting a tire; and means for detachably securing the rim to the mounting portion of the hub disc portion.

21. An assembly according to claim 20 wherein the foam in each cavity is injected thereinto for curing and adhesion to the associated structural members during the curing.

22. An assembly according to claim 20 including a pair of the foam filled rims mounted on the mounting portion of the hub disc portion by the securing means.

23. An assembly according to claim 22 wherein the rims include radial mounting portions that extend inwardly and engage each other during mounting of the rims to the disc portion.

24. An assembly according to claim 23 wherein the mounting portions of the rims and the disc portion each include spaced portions of their associated structural members, apertured spacers positioned between the spaced portions of the structural members to provide support therebetween, and attachment bolts extending between the mounting portions and through the spacers to provide the detachable securement of the rims to the disc portion of the hub.

25. An assembly according to claim 20 wherein the disc portiion includes circumferentially spaced ribs with depressions therebetween.

26. An assembly according to claim 25 wherein the structural members include axially spaced portions adjacent the depressions with apertured spacers therebetween to provide support between the structural members that enables bolts to extend through these spacers and secure a brake component to the disc portion of the hub.

27. An assembly according to claim 25 wherein the ribs include radial surfaces that face outwardly to engage and position the rim during the securement thereof to the disc portion of the hub.

28. An assembly according to claim 20 wherein the hub includes an annular inner structural member and a pair of structural members that oppose each other axially to cooperate with the inner member in defining the cavity.

29. An assembly according to claim 28 wherein one of the axially opposed structural members has an annular configuration and the other includes circumferentially spaced ribs between which depressions are formed.

* * * * *

UNITED STATES PATENT OFFICE

CERTIFICATE OF CORRECTION

Patent No. 4,035,028 Dated July 12, 1977

Inventor(s) Raymond J. Wilcox

It is certified that error appears in the above-identified patent and that said Letters Patent are hereby corrected as shown below:

Column 5, line 27 "bearing" should be --bearings--.

Column 8, line 39 "As" should be --An--.

Column 10, line 22 after adhere "to" should be --the--.

Column 12, line 20 "portiion" should be --portion--.

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*